United States Patent [19]

Alleaume

[11] 3,724,411

[45] Apr. 3, 1973

[54] SUPPORT FOR A SELF-CARRYING STORAGE OR CONVEYING TANK

[75] Inventor: Jean H. Alleaume, Saint-Cloud, France

[73] Assignee: Technigaz, Paris, France

[22] Filed: Feb. 4, 1971

[21] Appl. No.: 112,570

[30] Foreign Application Priority Data

Mar. 26, 1970 France..............................7010991

[52] U.S. Cl. ..............................................114/74 T
[51] Int. Cl. ............................................B63b 25/08
[58] Field of Search.....114/72, 73, 74 R, 74 A, 74 T, 114/75, 83; 220/15, 9 LG, 12, 1 B; 248/146, 317, 318

[56] References Cited

UNITED STATES PATENTS 3,072,088    1/1963    Stroschein..........................114/74 A
3,616,959   11/1971    Remesy et al. .........................220/12
3,172,566    3/1965    Mullin et al. .......................220/12 X
3,251,501    5/1966    Mesnager...............................220/15

FOREIGN PATENTS OR APPLICATIONS 1,029,254    4/1958    Germany...........................114/74 R Primary Examiner—Milton Buchler
Assistant Examiner—Stuart M. Goldstein
Attorney—Kenyon & Kenyon Reilly Carr & Chapin

[57] ABSTRACT

A suspension device for a vehicle-borne rigid storage tank consisting of spaced fastening supports connected to the vehicle structure and to the tank. The supports are distributed horizontally about the tank. The connections between the supports and vehicle structure are provided by rigidly interconnected beams parallel with a horizontal plane of the vehicle and are arranged in a polygonal, convex configuration surrounding the tank.

14 Claims, 6 Drawing Figures

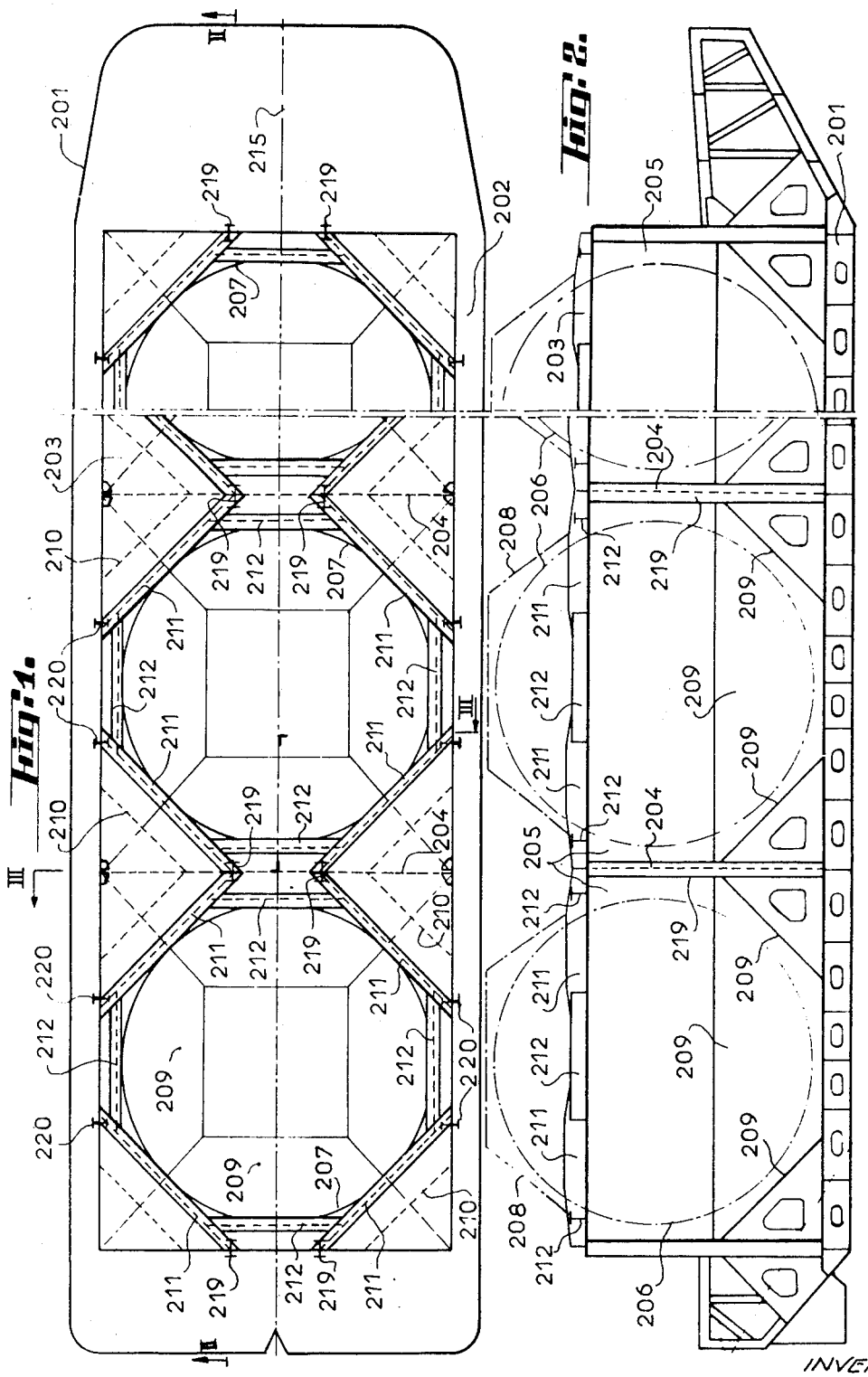

INVENTOR
JEAN H. ALLEAUME

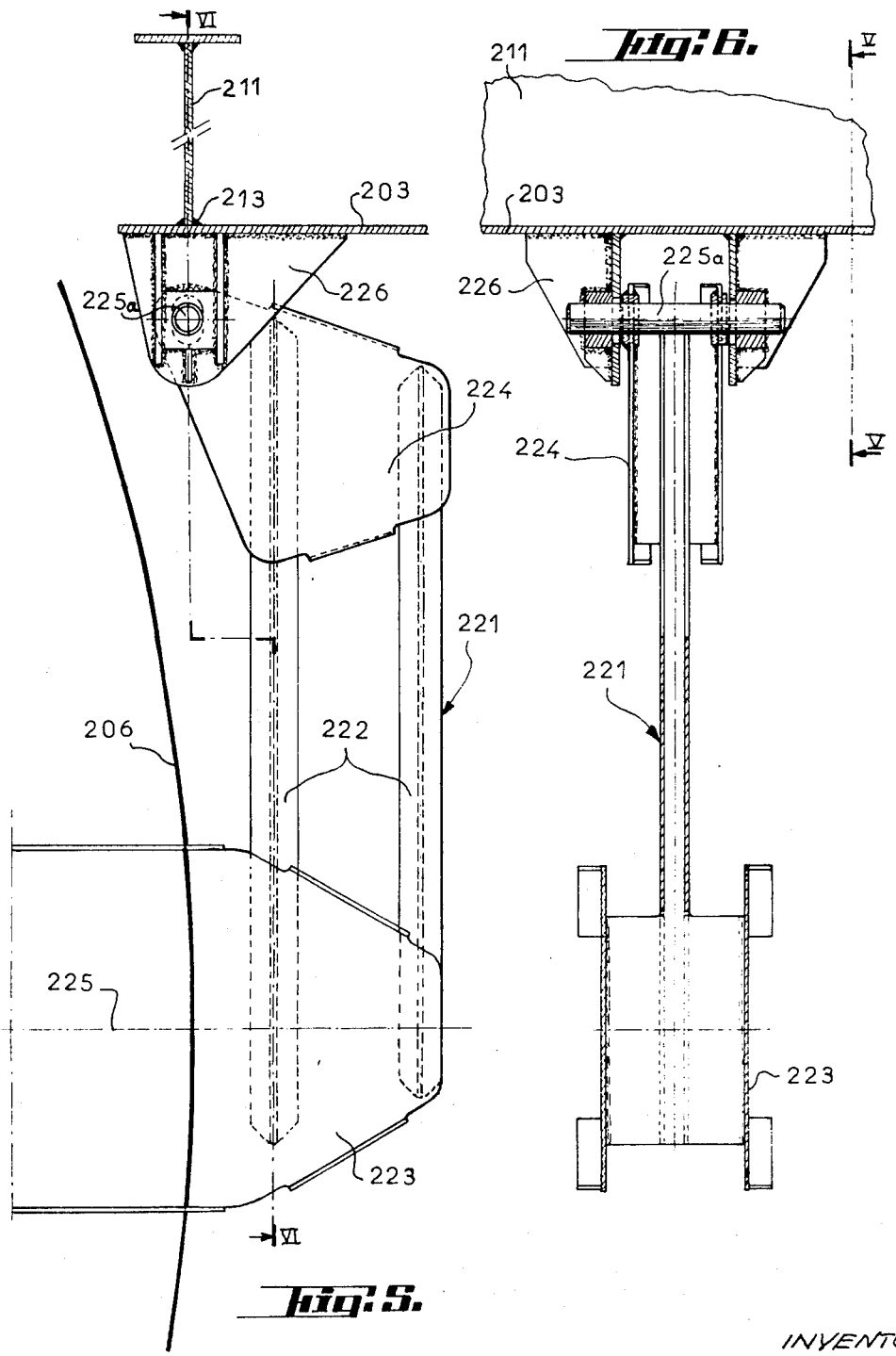

SUPPORT FOR A SELF-CARRYING STORAGE OR CONVEYING TANK

The present invention relates generally to and has essentially for its object improvements and modifications to the suspension device for a rigid or self-carrying storage and/or conveying tank, vat, cistern or like container, in particular on a vehicle or the like, of the type disclosed in U.S. Pat. application Ser. No. 834.337 filed on June 18, 1969 now U.S. Pat. No. 3,583,352 in the name of the applicant, and more particularly but not exclusively a specific form of embodiment of the said device as well as the applications and uses resulting from the putting into practice thereof and the systems, assemblies, constructions, equipments and plants provided with such devices.

In the said patent application there is described a suspension device composed of several preferably substantially similar or identical fixing supports in spaced relationship, each of which is connected, on the one hand, to the structure (body, frame or hull) of the said vehicle and, on the other hand, to the said tank by being distributed substantially horizontally about the latter. The said vehicle may also be, in particular, a tank vessel provided with multiple successive adjacent holds, each containing a tank having advantageously a shape of revolution about a relative vertical geometrical axis and being for instance at least approximately spherical or spheriodal. According to one modified form of embodiment described in the said patent application, each said support has at least approximately the shape of an at least partially hinged parallelogram or like quadrilateral and is hinged to the said stationary structure at a point located above the relative horizontal plane containing its point of rigid connection with the said tank, which is thus suspended from the said support. In the case of a tank having a shape of revolution, in particular a spherical tank, the various points of connection between the said supports and the tank are located substantially in the equatorial plane of the latter, so that the said axes of suspension are located above the said plane and the tank is thus supported in a state of substantially stable equilibrium.

Such a construction has several drawbacks. In the first place, since the said supports are connected directly to the structure of the vehicle, for instance to a ship's hull, which is deformable at least resiliently especially under the action of the external loads, forces and stresses to which it is subjected, the own deformations of the said structure affect the distribution of the tank weight on the various supports and disturbs the said distribution which thus ceases being uniform. This may casually entail abrupt and prohibitive overloads on some of the supports. In the second place, the presence of multiple hinges in the said supports substantially increases the manufacturing cost of such supports owing to the close tolerance limits which have to be complied with : the multiplicity of such hinges leads to an equal number of corresponding plays in operation, the cumulative effect of which is generally not negligible, and this may have an unfavorable influence on the aggregate behavior of the suspension system. Moreover, the lubrication of such multiple hinges is generally not satisfactory and, since the said hinges perform, in principle, only small motions, their use is a costly superfluity.

The main purpose of the present invention is to avoid such drawbacks by improving the forms of embodiment described more particularly in the aforementioned patent application and especially the embodiment illustrated in FIG. 2. To this end, the suspension device according to the present invention is characterized in that the connection with the said vehicle structure is obtained through the medium of a system of beams solid with one another, substantially parallel with a relative horizontal plane of the said vehicle, forming bearings for the said supports and arranged according to an at least approximately polygonal or convex configuration surrounding the said tank and forming a unit-construction framework rigidly secured to the said structure at least by the ends of at least some of the said beams, called main beams, the said system being so arranged as to absorb, balance or compensate for the stresses resulting from the weight of the tank and its contents as well as from the various particular motions, especially the roll-and-pitch motions, of the vehicle. Such an arrangement is advantageous in that the said supports, instead of being hinged directly to the vehicle structure, for instance to the ship's hull, which is deformable, are hinged to a system of beams which are rigidly connected to the said structure and the transitory resilient bending of which enables the distribution of the, for instance, loaded or filled tank to be kept uniform on the various supports in spite of the temporary or momentary own deformations of the vehicle structure, for instance of the ship's hull.

According to another feature of the invention, each of the said main beams is supported at its mutually opposite ends by two posts or the like secured to the said structure, so as to constitute the upper cross-piece or cross-beam of a portal or the like, the legs, stanchions or uprights of which are constituted by the said posts.

According to still another feature of the invention, the said system of beams is directly incorporated in the said vehicle structure, thus forming an integral part thereof and possibly reinforcement means therefor.

According to another feature of the invention, each said suspension support, which is at least approximately parallelogram- or trapezium-shaped, has its two substantially vertical and parallel sides constituted by two bars rigidly connected by their mutually opposite ends to, respectively, a lower clevis or yoke which is externally solid with the said tank and an upper clevis or yoke hinged to a bracket secured against and under an associated said beam. Such a construction is advantageous in that each suspension support includes only one hinge which is the suspension hinge, whereas its two substantially vertical parallel sides offer sufficient individual deformability, for instance through resilient bending, to absorb, balance or compensate for all the stresses to which they are likely to be subjected in use.

The invention also relates to a vehicle equipped with the said device and in particular a tank vessel provided with multiple successive adjacent holds, each containing a, for instance, at least approximately spherical or spheroidal tank suspended from a device of the kind described, the said vessel being characterized in that the said systems of beams for the said tanks are interconnected, from one hold to the contiguous hold, by the adjacent ends of the main beams at the partition wall.

The invention will be better understood and other purposes, features, details and advantages of the latter will appear more clearly from the following explanatory description, with reference to the appended diagrammatic drawings given solely by way of example illustrating one form of embodiment of the invention and wherein :

FIG. 1 is an interrupted top view of a tank vessel forming a barge, lighter or the like provided with spherical tanks which are omitted in the figure ;

FIG. 2 is a longitudinal sectional view upon the line II—II of FIG. 1 with the spherical tanks shown in dot-and-dash lines ;

FIG. 5 is a fragmentary side view, at a larger scale and partially in section upon the line V-V of FIG. 6, showing externally a suspension support in the mounted state ;

FIG. 6 is a sectional view upon the broken line VI-VI of FIG. 5.

Figure 3:
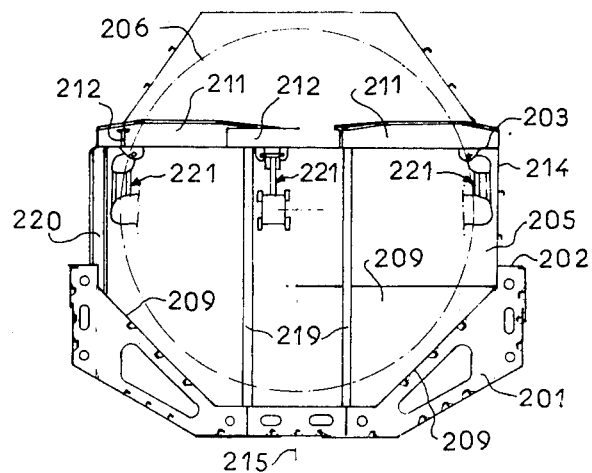
FIG. 3 is a cross-sectional view upon the broken line III—III in FIG. 1.

The example of embodiment shown in FIGS. 1 to 3 applies to an open-sea barge or lighter, for instance for conveying liquefied natural gas, although the invention is also applicable to vehicles other than tank vessels or tank boats, such as for instance land rolling-vehicles or the like. The barge is constituted by a hull 201, advantageously a double-bottom and double-wall hull, defining a main deck 202 and an upper deck 203 forming with the hull an enclosure, the internal space of which constitutes a hold subdivided by transverse partition walls 204 into a certain number of separate adjacent compartments 205, each of which contains or is intended to contain a spherical tank or the like 206. The upper deck 203 is provided, above each compartment 205, with a substantially circular opening 207 forming a hatch or the like in the planking of the upper deck and through which the upper end of the associated tank 206 projects outwardly and is covered with a protecting cap, hood or the like 208.

The lower portion of each hold compartment 205 is in the shape of a regular truncated cone defined by inclined side walls 209 and the substantially square small base of which is constituted by the hold floor. Above this lower space having the shape of a truncated cone, a space intended for the heat-insulating material is defined by additional vertical side walls 210 in proximity to the corners or angles of the compartment.

Each tank is supended from a system of beams incorporated in a deck of the vessel, for instance the upper deck 203 of a barge. Each system of beams comprises main beams 211 and secondary beams 212, each of which interconnects two successive adjacent main beams 211 and is solid therewith, each main beam 211 extending preferably, with its mutually opposite ends, beyond the respective secondary beams adjacent to the said main beam.

Figure 4:
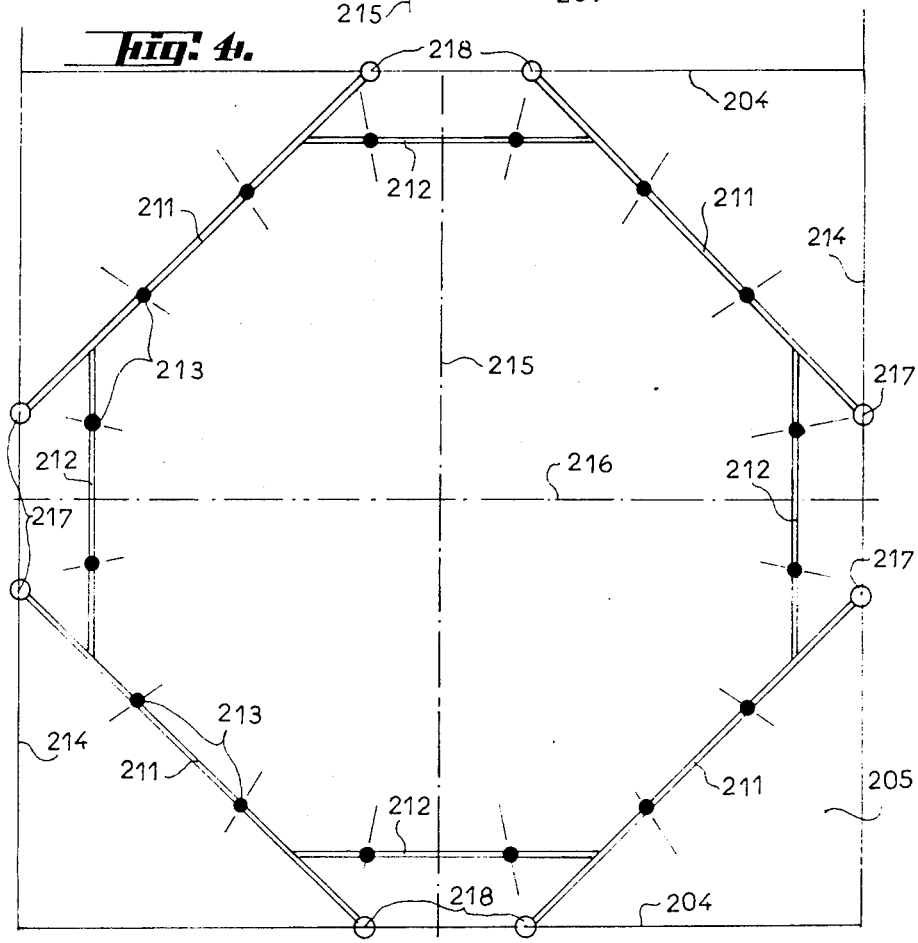
FIG. 4 is a diagrammatic top view, at a larger scale, of the system of beams and of the positions of the suspension supports for a tank.

Such a system of beams is shown in a very simplified diagrammatic form in FIG. 4 with the locations of the fixing points 213 of the suspension supports for the tank. In this figure are also shown two successive transverse partition walls 204 and the two mutually opposite longitudinal inner walls 214 of the hull, defining the hold compartment 205. Such a system of beams as well as the said suspension supports and their fixing positions are advantageously substantially symmetrical with respect to the relative lontitudinal vertical plane 215, possibly the medial longitudinal vertical plane of the vehicle, i.e., of the barge, and/or to a relative transverse vertical plane 216 which is substantially perpendicular to the first-named plane. Each pair of ends 217 of the main beams 211, respectively symmetrical with respect to the medial longitudinal relative vehicle plane 215, is preferably integrated to one and the same frame forming part of the structure of the vehicle, hence of the vessel, whereas each pair of ends 218, possibly symmetrical with respect to a transverse relative vertical plane 216, is aligned in parallel relationship with the said longitudinal plane. The said ends 217, 218 of the main beams 211 are thus advantageously incorporated in the respective longitudinal and transverse partitions and/or walls of the structure of the vehicle constituted, in the case considered, by a vessel. Since the tank 206 has a shape of revolution about a relative vertical geometrical axis, each said system of beams as well as, preferably, the suspension supports and their fixing positions are substantially symmetrical with respect to the said relative vertical axis.

The same beams are incorporated in the planking of the upper deck 203 and thus constitute the beams of the deck structure, whereas the adjacent ends 218, 217 of the main beams 211 are supported respectively by hold pillars 219 integrated to one and the same, endmost or intermediate transverse partition wall, and by frame or the like 220 integrated to the hold side walls of the ship's holds. According to the example of embodiment illustrated, each system of beams is composed of four longer main beams 211 and four intermediate shorter beams 212 which are substantially straight and form an octagon whose mutually opposite sides are respectively parallel with one another and wherein, preferably, two mutually opposite shorter sides 212 are substantially parallel with the longitudinal direction 215 whereas the other two mutually opposite shorter sides 212 are perpendicular to the said direction. The transverse vertical planes passing through the ends 218 of the main beams 211 correspond respectively to reinforced frames, whereas the longitudinal vertical planes passing through the ends 217 of the main beams correspond to reinforced longitudinal frames. Bearings serving to absorb, balance or compensate for the forces resulting from roll-and-pitch motions are provided symmetrically with respect to the equatorial plane of the spherical tank in, respectively, the transverse regions of the ends 218 and the longitudinal regions of the ends 217 of the main beams.

In the example illustrated in FIG. 4 there are provided at points 213 16 suspension supports in spaced relationship, namely two supports respectively for each main beam 211 or secondary beam 212, distributed at least approximately uniformly about the tank 206, whose weight together with that of its contents as well as the forces resulting from vertical accelerations are thus trans-mitted by the said beams to the ends 217, 218 of the main beams 211 and therefrom to the ship's hull 201.

In FIG. 3, only a few suspension supports 221 are shown and their structure is seen more clearly on FIGS.

5 and 6. Each suspension support 221 advantageously comprises two substantially parallel and vertical bars 222 in spaced relationship, having for instance an I-shaped cross-section and secured respectively at their mutually opposite ends, as by welding, in two clevises, yokes or the like, namely and respectively a lower clevis 223 and an upper clevis 224, each of which is constituted for instance by two substantially parallel side plates. The lower clevis 223 is rigidly secured to the tank 206 substantially at the level of the relative horizontal equatorial plane 225 of the tank 206. The upper clevis 224 is pivotally mounted, by means of a substantially horizontal hinge pin or the like 225a arranged in perpendicular relationship with the vertical plane containing the bars 222, in a suspension bearing or the like 226 secured to the underside of the lower flange of the associated main beam 211 or secondary beam 212 which is advantageously provided with a substantially vertical web. Each support 221 is thus capable of oscillating in a relative vertical plane about its suspension pin 225a. The legs 222 of each support have sufficient resilient flexibility to be temporarily deformed according to the instantaneous conditions or forces actually applied.

Of course, the invention is by no means limited to the forms of embodiment described and illustrated, which have been given by way of example only. In particular, it comprises all the means constituting technical equivalents to the means described as well as their combinations, should the latter be carried out according to the gist of the invention.

What is claimed is:

1. A suspension device for a rigid storage tank, in particular on a vehicle consisting of several, substantially similar spaced fastening supports each of which is connected, on the one hand, to the structure of said vehicle and, on the other hand, to said tank and distributed substantially horizontally about the latter, wherein the improvement consists in that the connection between said supports and said structure is provided by a system of rigidly interconnected beams substantially parallel with a relative horizontal plane of said vehicle, forming bearings for said supports and arranged according to an at least approximately polygonal, convex configuration surrounding said tank and forming a unitary framework rigidly secured to said structure at least by the ends of at least some so-called main beams, said system being designed to sustain the stresses resulting from the weight of the tank and of its contents and from the roll and pitch motions of the vehicle; and in that each support is at least approximately in the shape of a parallelogram, and pivotally connected to said stationary structure at a point located above the relative horizontal plane containing the point of rigid connection of said support with said tank, which latter is thus suspended from said framework, whereas the two substantially vertical, parallel sides of the said support consist of two rods rigidly connected at their bottom ends to a bracket rigidly connected to said tank and at their top ends to a clevis pivotally connected to a hanger secured to and under an associated beam.

2. A device according to claim 1, wherein each main beam is supported at its opposite ends by two posts, respectively, secured to said structure so as to form the upper cross-beam of a portal frame.

3. A device according to claim 1, comprising secondary beams, each of which connects two successive adjacent main beams and is solid therewith, each main beam extending with its opposite ends, respectively, beyond the secondary beams adjacent to said main beam.

4. A device according to claim 1, wherein said system of beams and said supports are substantially symmetrical with respect to the relative longitudinal vertical center plane of said vehicle, and to a relative transverse vertical plane substantially perpendicular to the first-named plane.

5. A device according to claim 1, provided in a vehicle structure comprising transverse frames and wherein each pair of main beam ends, respectively symmetrical with respect to said longitudinal relative vertical center plane, is integrated into one and the same transverse frame of said vehicle structure, whereas each pair of ends which are symmetrical with respect to said transverse relative vertical plane is aligned in parallel relationship with said longitudinal plane.

6. A device according to claim 1, provided in a vehicle formed with longitudinal and transverse walls and wherein the ends of said main beams are incorporated in respective longitudinal and transverse walls of said vehicle structure.

7. A device according to claim 1, for a tank having a shape of revolution about a relative vertical geometrical axis, wherein said system of beams and the supports are substantially symmetrical with respect to said relative vertical axis.

8. A device according to claim 1, for a tank mounted aboard a ship in one hold thereof and wherein said system of beams is incorporated into a ship's deck, whereas the adjacent ends of the said main beams are supported respectively by hold pillars integrated into adjacent transverse partition walls, and by frames integrated into the hold side walls.

9. A device according to claim 8 in a ship provided with multiple successive adjacent holds separated from each other by transverse partition walls and each containing an at least approximately spherical storage tank suspended from said device, wherein said systems of beams for the said tanks are interconnected, from one hold to the next contiguous hold, by the adjacent ends of the main beams at the transverse partition walls.

10. A transport vehicle for conveying at least one storage tank, at least one intermediate portion of which has a shape of revolution about a geometrical axis which is substantially vertical relative to said vehicle and located in the vertical longitudinal center plane thereof, said vehicle comprising: a substantially horizontal flat framework of at least approximately octogonal convex configuration which is substantially symmetrical with respect to said axis and surrounds the upper portion of said tank; and a plurality of at least approximately vertical substantial link means substantially uniformly distributed horizontally about said tank in space relationship and connected to the outer periphery thereof with their bottom ends lying on a level in the same horizontal plane whereas said link means are pivoted with their top ends at discrete points to the underside of said framework for swinging motion in vertical planes, respectively, passing through said axis, so that said tank is supported in depending hanging relationship from said framework; said framework comprising four substantially straight main beams forming long side members of said octogonal configuration which extend at an angle with respect to said vertical longitudinal center plane and four substantially straight auxiliary beams forming short side members of said octogonal configuration which alternate with said main beams and rigidly interconnect same, one pair of opposite auxiliary beams being parallel and the other pair being perpendicular to said vertical longitudinal center plane; each main beam being supported at its opposite ends on two upright posts secured to said vehicle and each main beam extending with its opposite ends, respectively, beyond the auxiliary beams adjacent to said main beam.

11. A vehicle according to claim 10 with a body structure comprising transverse frames and wherein each pair of main beam ends, respectively symmetrical relative to said vertical longitudinal center plane, is integrated into one and the same transverse frame of said structure whereas each pair of main beam ends, which are symmetrical with respect to a vertical transverse plane passing through said axis is aligned in parallel relationship with said longitudinal plane.

12. A vehicle according to claim 11 forming a tank ship with at least one tank mounted in one hold of said ship and wherein said framework is incorporated into a ship's deck whereas the adjacent ends of said main beams are supported respectively by hold pillars integrated into adjacent transverse partition walls and by frames integrated into the side walls of said hold.

13. A vehicle according to claim 12 forming a ship provided with multiple successive adjacent holds separated from each other by transverse partition walls and each containing an at least approximately spherical storage tank suspended from the associated framework, wherein said frameworks for said tanks are interconnected from one hold to the next contiguous hold by the adjacent ends of said main beams at the transverse partition walls, respectively.

14. A vehicle according to claim 11 wherein each link means is at least approximately in the shape of a parallelogram two substantially vertical parallel sides of which consist of a pair of spaced rods rigidly connected at their bottom ends to a bracket rigidly connected to said tank and at their top ends, to a clevis pivotally connected to a hanger secured to and underneath an associated beam.

* * * * *